United States Patent [19]
Larsen

[11] 3,751,058
[45] Aug. 7, 1973

[54] COMBINED SNOW SHOVEL, WHEEL BARROW AND DOLLY

[75] Inventor: Bjorn Arild Larsen, Oslo, Norway

[73] Assignee: Spigeiverk Christinania, Oslo, Norway

[22] Filed: Oct. 1, 1971

[21] Appl. No.: 185,656

[30] Foreign Application Priority Data
Oct. 9, 1970 Germany............ G 07 37 392.1

[52] U.S. Cl............... 280/30, 280/47.18, 280/47.26
[51] Int. Cl.............................................. B62b 3/02
[58] Field of Search............... 280/30, 47.18, 47.23, 280/47.26, 47.36, 47.37, 47.39

[56] References Cited
UNITED STATES PATENTS

| | | | |
|---|---|---|---|
| 2,461,353 | 2/1949 | Stelzer................................ | 280/30 |
| 3,037,308 | 6/1962 | Miller........................... | 280/47.37 R |
| 3,350,797 | 11/1967 | Dassinger........................ | 280/47.18 |
| D175,069 | 7/1955 | Gandola........................... | 280/47.26 |

Primary Examiner—Kenneth H. Betts
Assistant Examiner—John McCormack
Attorney—Wenderoth, Lind & Ponack

[57] ABSTRACT

A multi purpose, manually operated carrying device, which can be utilized as a wheel barrow, a dolly or as a snow shovel. It comprises a substantially flat bottomed, trough-shaped container with two opposite side walls, and one transverse end wall, which container is adapted for a pair of wheels and provided with a pivotable handle member. The handle member and the container are mutually adapted to each other such that the handle member can be fixed to the container in a first position wherein the handle member extends along the substantially flat container bottom and making the device operative as a dolly, and in a second position wherein the handle member can be fixed to the end wall making the device operative as a wheel barrow. A snow shovel is provided upon removal of the wheels.

8 Claims, 4 Drawing Figures

PATENTED AUG 7 1973 3,751,058

PATENTED AUG 7 1973

COMBINED SNOW SHOVEL, WHEEL BARROW AND DOLLY

BACKGROUND OF THE INVENTION

The invention relates to multi purpose, manually operated carrying devices, more particularly to a device which in accordance with the need can be utilized as wheel barrow, dolly or snow shovel.

The object of the invention is to provide a device of the above defined art which is practical to use and simple to convert in order to be operated as a wheel barrow, dolly or as a snow shovel, respectively. The device will be particularly suitable for houseowners gardeners and the like, i.e. people meeting the need for a show shovel during the wintertime, a garden wheel barrow during the spring and summer season, and furthermore need a dolly suitable for carrying more heavy objects.

A particular property of the device in accordance with the invention is that, as a two-wheeled wagon it can be assembled in two fashions such that the device is suitable as a wheel barrow or as a dolly for carrying more heavy objects. By means of simple handgrips the device can be transformed from one form or function to another.

The device in accordance with the invention is of the kind comprising a wholly or entirely flat bottomed, shallow trough-shaped container provided with a sidewall on each opposite side and one end wall or transverse wall at its rear end, and the device is adapted to receive a pair of wheels and furthermore a rodshaped, preferably U-shaped handle member. The device in accordance with the invention is particularly characterized therein that the handle and the container are so adapted to each other that the handle may be fixed to the container in two positions, namely first in a position along the substantially flat bottom part of the container, when the device shall be utilized as a dolly for carrying bags or the like, and second, in a position fixed to the end wall when the device shall serve as a wheel barrow or a snow shovel. The wheels can be removed to allow the device to serve as a snow shovel.

In a preferred embodiment of the invention the handle member is pivotally supported on the container about an axis which extends across the container at the corner or transition zone between the rear end wall and the flat bottom of the container. The device is transformed from serving as dolly to a wheel barrow simply by pivoting the handle member about the container to positions against the substantially flat bottom of the container or against the end wall, respectively. The handle member and the container are fixedly attached to each other in their respective positions by means of clamps or the like which are positioned between the handle member and the container.

A further feature of the invention is that the support shaft for the wheels also is utilized as the pivot for the handle member.

BRIEF DESCRIPTION OF THE DRAWINGS

An embodiment for a device in accordance with the invention is illustrated in the accompanying drawings, wherein:

FIG. 4 is a further perspective view of the device when it is adapted as a dolly for carrying heavy bags or the like.

DETAILED DESCRIPTION OF THE INVENTION

Figure 1:
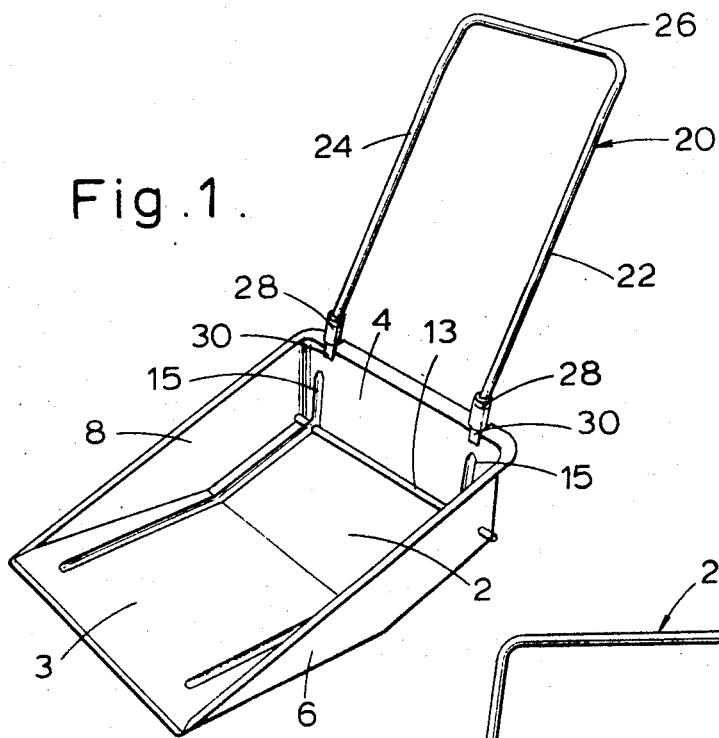
FIGS. 1 and 2 show, respectively, a perspective view and a view from the bottom of the device while the same is assembled with a handle member but without wheels, such that the device is ready to be utilized as a snow shovel.
Figure 2:
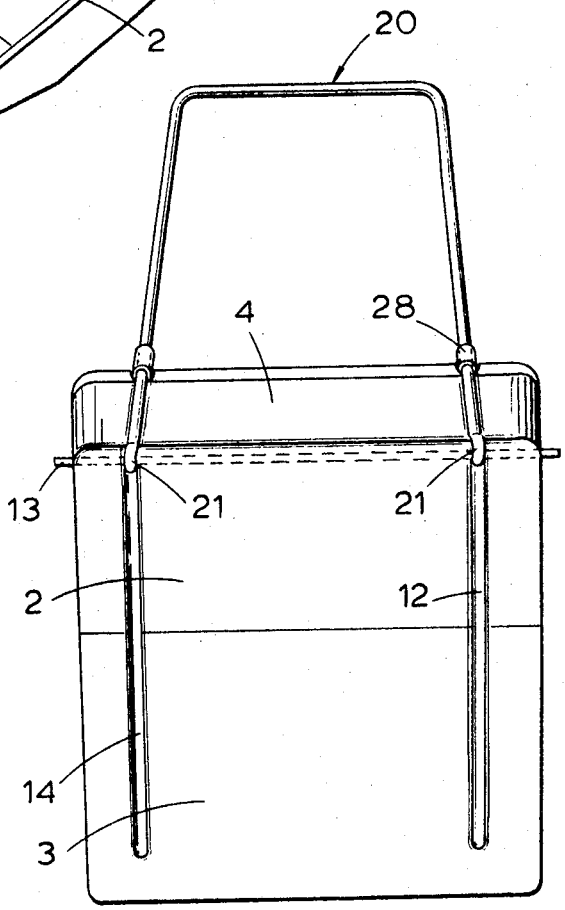

As it appears from FIG. 1 or 2, the open container or shovel 1 has a substantially flat bottom 2, the fore part 3 of which slopes at an acute angle upwardly from the plane of the rearly positioned flat bottom part 2. The container is provided with a substantially upright end- or transverse wall 4 and furthermore provided with side walls 6 and 8 which towards the fore end converge to zero, such that the fore edge of the container provides a plate-shaped edge. The bottom portion and the end wall are pro-vided with two mutually spaced, parallel wide grooves or recesses, portions 12 of which are in bottom part 2, portions 14 of which are in fore part 3, and portions 15 of which are in end wall 4, and which are adapted to support and receive a two part handle member 20.

Figure 3:
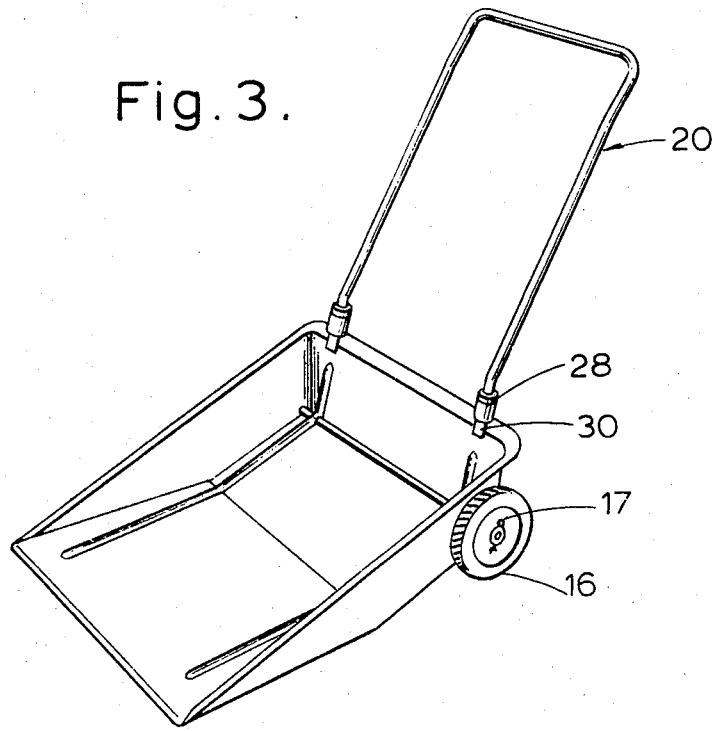
FIG. 3 is a perspective view of the device adapted as a wheel barrow.

Transversely of the container substantially at the transition zone or corner between the bottom 2 and the end wall 4 is provided a support shaft 13 having extensions on each side of the container whereon are removably mounted wheels 16 and 18. The shaft 13 is positioned through portions 12 of the recesses formed in the container. The shaft provides pivotable support at points 21 for the side legs 22,24 on the handle member. The handle member is for instance made of steel piping and has a transverse leg 26 serving as handle. On each side of the legs 22 and 24 are provided slideable clamps 28, each of which has an ear or hook 30 engageable with the adjacent edge of the container as illustrated in FIGS. 1 and 3, and operative to fix the handle member to the container in two alternative positions.

As it appears from the Figures the side legs 22 and 24 are provided with a bend in transition zone 31 such that the side legs have angles which correspond to the angle between the two parts 2 and 3 of the container bottom. Furthermore, in the position of FIGS. 1-3, the handle member legs 22 and 24 come into firm rest against the container in the recess portions 15, and in the position of FIG. 4, legs 22 and 24 rest in recess portions 12 and 14 in bottom part 2 and fore part 3, respectively.

A correct angular adaption between the handle member and the container, respectively, has proved quite important in order that the centre of gravity of the entire device is located correctly for easy driving.

The wheels 16 and 18 are threaded onto the extensions on the shaft 13 and are, for instance by means of pins 17 or the like, fastened thereon.

Figure 4:
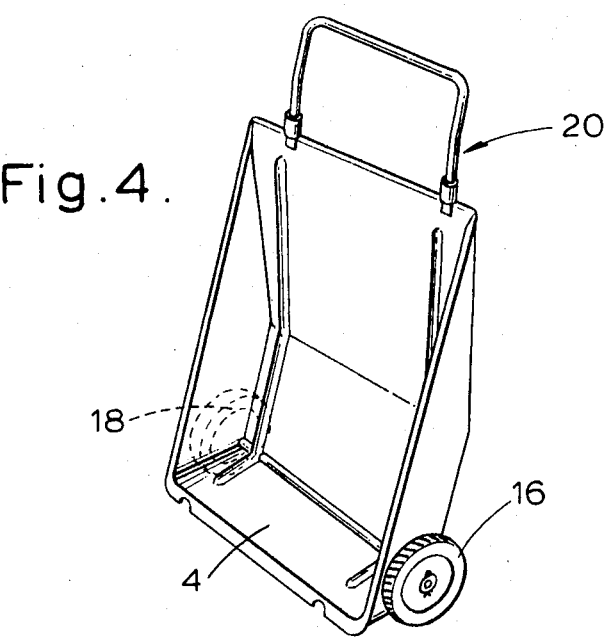

FIGS. 1 and 2 show the device with the two wheels removed and thus ready to be used as a snow shovel, the container serving as a scoop. FIG. 3 shows the device with wheels and adapted to be utilized as a wheel barrow such that it will be suitable for carrying grass, leaves etc. FIG. 4 shows the device adapted as a dolly. The handle member is here, as compared with the situation shown in FIG. 3, pivoted around the container and fixed against the container bottom such that the end wall 4 constitutes the actual bottom of the vehicle, now serving as a dolly. It appears that the centre of gravity of the goods carried therein will be positioned substantially straight above the wheel shaft, thus making the dolly suitable for carrying more heavy loads, such as bags, boxes or the like.

What is claimed is:

1. A combined wheel barrow, dolly and snow shovel device comprising:

a container having a substantially flat, trough-shaped bottom, two opposite side walls, and one transverse end wall joining said bottom and side walls;

a pair of wheels removably connected to said container;

a handle member pivotably attached to said container about an axis extending thereacross at the corner of juncture of said bottom and said end wall and located inwardly of the outer portions of said side walls;

said handle member being pivotable about said axis from a first position abutting said bottom, whereby said device is operable as a dolly, to a second position abutting said end wall, whereby said device is operable as a wheel barrow and, with said wheels removed, as a snow shovel; and means to selectively fix said handle member to said bottom and said end wall in said first and second positions, respectively.

2. A device as claimed in claim 1, further comprising an axle fixed to said container, said wheels being removably mounted on said axle.

3. A device as claimed in claim 2, wherein said axis corresponds to said axle, and said handle member is pivotably mounted on said axis.

4. A device as claimed in claim 1, wherein said handle member is U-shaped and comprises a pair of side legs joined by a transverse leg, said side legs abutting said bottom and said end wall when said handle member is in said first and second positions, respectively.

5. A device as claimed in claim 4, wherein said means to fix comprises clamping means slidably mounted on said side legs for attachment to said bottom and end wall.

6. A device as claimed in claim 4, wherein said bottom comprises a flat bottom part and a fore part extending upwardly from the plane of said bottom part at an acute angle, and wherein said side legs are bent at an equal acute angle at a position to align with the juncture between said bottom part and said fore part when said handle member is in said first position.

7. A device as claimed in claim 6, further comprising recesses formed in said bottom and said end wall, said side legs being received in said recesses when said handle is in said first and second positions, respectively.

8. A device as claimed in claim 1, further comprising recesses formed in said bottom and said end wall, said handle member being received in said recesses when in said first and second positions, respectively.

* * * * *

UNITED STATES PATENT OFFICE
CERTIFICATE OF CORRECTION

Patent No. 3,751,058          Dated August 7, 1973

Inventor(s) Bjorn Arild Larsen

It is certified that error appears in the above-identified patent and that said Letters Patent are hereby corrected as shown below:

Correct the spelling of the Assignee:

-- Christiania Spigerverk, Oslo, Norway --

Correct the Foreign Application Priority Data:

-- Oct. 9, 1970  Germany .......... G 70 37 392.1 --

Signed and sealed this 6th day of August 1974.

(SEAL)
Attest:

McCOY M. GIBSON, JR.                C. MARSHALL DANN
Attesting Officer                   Commissioner of Patents